(12) United States Patent
Yoshida et al.

(10) Patent No.: US 6,706,850 B2
(45) Date of Patent: Mar. 16, 2004

(54) POLYETHER COPOLYMER

(75) Inventors: Yuji Yoshida, Tokyo (JP); Akira Yokota, Tsukuba (JP); Hyuncheol Choi, Rosebery (AU)

(73) Assignee: Sumitomo Chemical Company, Limited, Osaka (JP)

( * ) Notice: Subject to any disclaimer, the term of this patent is extended or adjusted under 35 U.S.C. 154(b) by 139 days.

(21) Appl. No.: 09/833,652

(22) Filed: Apr. 13, 2001

(65) Prior Publication Data

US 2002/0006999 A1 Jan. 17, 2002

(30) Foreign Application Priority Data

Apr. 17, 2000 (JP) .......................... 2000-114743

(51) Int. Cl.⁷ .......................... C08G 65/38; C08G 65/32
(52) U.S. Cl. .......................... 528/219; 525/403; 525/405
(58) Field of Search .......................... 528/219; 525/403, 525/405

(56) References Cited

U.S. PATENT DOCUMENTS

| 5,128,422 A | * | 7/1992 | Kowalczik et al. ......... 525/397 |
| 5,776,990 A | | 7/1998 | Hedrick et al. ............... 521/77 |

FOREIGN PATENT DOCUMENTS

| JP | 57-195122 | * 11/1982 |
| JP | 5-205526 | 8/1993 |
| JP | 8-162450 | 6/1996 |

* cited by examiner

*Primary Examiner*—Peter Szekely
(74) *Attorney, Agent, or Firm*—Birch, Stewart, Kolasch & Birch, LLP

(57) ABSTRACT

A polyether copolymer comprising (A) an aromatic polyether block and (B) an aliphatic polyether block is provided.

4 Claims, No Drawings

POLYETHER COPOLYMER

BACKGROUND OF THE INVENTION

1. Field of the Invention

The present invention relates to a polyether copolymer, a process for producing the same, a coating solution for forming a porous organic film that is suitable as an insulating film usable in electronic devices and a process for forming a porous organic film.

2. Description of Related Art

Speeding up of LSI can be attained by fining of transistors constituting it. In recent years, the shrinking design rule of IC, LSI and the like has led to increased interconnection delay (RC delay) caused by parasitic capacity in an insulation film. For solving interconnection delay, it is desired that an insulation film has lower dielectric constant. These have become important problems that inhibit upgrading of performance of LSI itself. As a means for solving these problems, lowering of dielectric constant of insulating film filled between wires has been considered.

Dielectric constant is generally proportional to the density and electronic polarizability of material itself, as indicated in Clausis-Mosotti's formula. Therefore, dielectric constant can be lowered by diminishment of density when a material is made porous. For example, JP-A-8-162450 and JP-A-10-70121 disclose methods for obtaining porous silica films by mixing fine particles of silica with an alkoxysilane or a partial hydrolysis thereof thus controlling the shrinkage factor. In these methods, however, because not only the water absorption of silica film itself is significant but also the surface area increases by making porous, the water absorption and dielectric constant of silica film are liable to increase. A hydrophobic treatment of a surface of silica film becomes necessary as a countermeasure against it, and as the result, throughput is lowered.

Japanese Patent Specification No. 2,531,906 discloses an attempt in which a porous material of an organic resin, which has a lower water absorption and generally a lower dielectric constant as compared with silica, is used as an insulating film for electronic devices.

SUMMARY OF THE INVENTION

The objective of the invention is to provide a coating solution for forming a porous organic film that allows lowering of dielectric constant for use as an insulating material used in electronic parts and a process for forming a porous organic film, as well as a polyether copolymer used in said coating film and a process for producing the same.

As the result of an extensive study for a coating solution capable of forming a porous film usable in electronic parts and for a process for forming said porous organic film, the present inventors have found that the above purpose can be attained by a coating solution containing a polymer having a moiety that causes thermal decomposition at a relatively low temperature in a molecular chain and an organic solvent, and have completed the present invention.

Said coating solution can be applied easily on a substrate, and capable of forming uniform fine voids by decomposition of thermally decomposable moiety.

Therefore, the invention relates to the following [1]–[16]:

[1] A polyether copolymer comprising (A) an aromatic polyether block and (B) an aliphatic polyether block.

[2] A polyether copolymer according to [1], wherein (B) an aliphatic polyether block is on a side chain of (A) an aromatic polyether block.

[3] The polyether copolymer according to [1] or [2], wherein the aromatic polyether block (A) has a structural unit represented by the following formula (1):

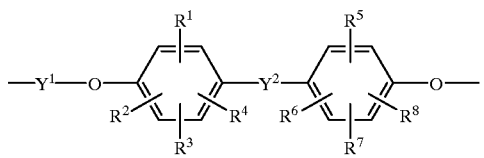

wherein $R^1$, $R^2$, $R^3$, $R^4$, $R^5$, $R^6$, $R^7$ and $R^8$ are independently selected from the group consisting of a hydrogen atom, a chlorine atom, an iodine atom, an alkyl group having 1 to 10 carbon atoms, an alkenyl group having 2 to 10 carbon atoms, an alkynyl group having 2 to 10 carbon atoms, a cycloalkyl group having 4 to 10 carbon atoms, a methoxy group, an ethoxy group, a phenyl group which may be substituted and a functional group represented by the formula (2) or (3) described below; $Y^1$ is selected from any one of functional groups described below or two or more of the functional groups; $Y^2$ is selected from any one of a single bond, a hydrocarbon group having 1 to 20 carbon atoms, an ether group, a ketone group and a sulfone group or two or more of them; at least one of $R^1$, $R^2$, $R^3$, $R^4$, $R^5$, $R^6$, $R^7$ and $R^8$ or $Q^1$, $Q^2$, $Q^3$, $Q^4$, $Q^5$, $Q^6$, $Q^7$, $Q^8$, $Q^9$, $Q^{10}$, $Q^{11}$, $Q^{12}$ and $Q^{13}$ in at least one unit structure contained in a molecular chain is selected from functional groups represented by the formula (3);

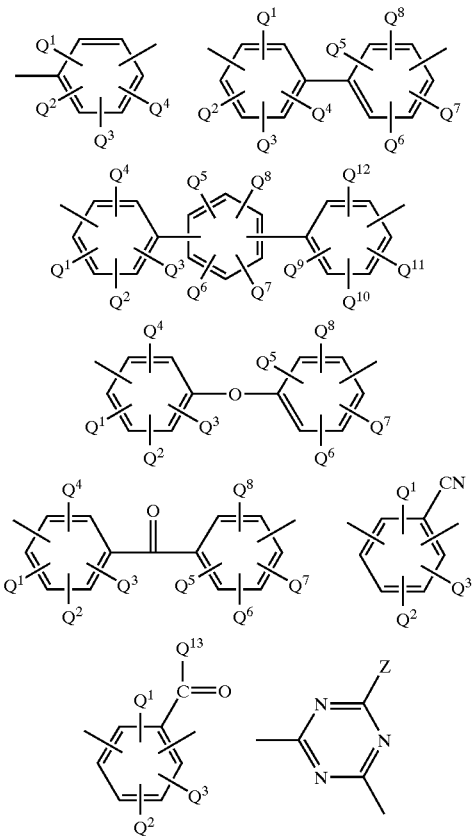

wherein and $Q^1$, $Q^2$, $Q^3$, $Q^4$, $Q^5$, $Q^6$, $Q^7$, $Q^8$, $Q^9$, $Q^{10}$, $Q^{11}$ and $Q^{12}$ are independently selected from the group consisting of a hydrogen atom, an alkyl group having 1 to 10 carbon atoms, an alkenyl group having 2 to 10 carbon atoms, an alkynyl group having 2 to 10 carbon atoms and a functional group represented by the formula (2) or (3) described below; $Q^{13}$ is selected from the group consisting of an alkyl group having 1 to 10 carbon atoms, an alkenyl group having 2 to 10 carbon atoms, an alkynyl group having 2 to 10 carbon atoms and a functional group represented by the formula (2) or (3); Z is selected from the group consisting of a hydrogen atom, a fluorine atom, a chlorine atom, a bromine atom, an iodine atom, a group —$OZ^1$ and a group —$NZ^2Z^3$; and $Z^1$, $Z^2$ and $Z^3$ are independently selected from the group consisting of a hydrogen atom, a saturated or unsaturated hydrocarbon group and an ether bond-containing group;

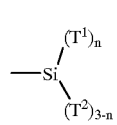

(2)

wherein $T^1$ is selected from an alkenyl group having 2 to 10 carbon atoms; $T^2$ is selected from an alkyl group having 1 to 10 carbon atoms and an aryl group; n represents an integer of 1 to 3 inclusive; plural $T^1$'s may be different from each other and plural $T^2$'s may also be different from each other;

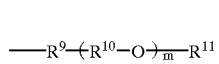

(3)

wherein $R^9$ is selected from a single bond and a hydrocarbon group having 1 to 10 carbon atoms; $R^{10}$ is selected from a hydrocarbon group having 1 to 10 carbon atoms; $R^{11}$ is selected from a hydrogen atom and a hydrocarbon group having 1 to 10 carbon atoms; and m is selected from an integer of 1 or more.

[4] The polyether copolymer according to [3], wherein $R^{10}$ is —$CH_2$—$CH_2$—, —$CH_2$—$CH(CH_3)$— or —$CH(CH_3)$—$CH_2$—.

[5] The polyether copolymer according to any of [1] to [4], wherein the relation between the thermal decomposition starting temperature Ta (° C.) of the aromatic polyether block (A) and the thermal decomposition starting temperature Tb (° C.) of the aliphatic polyether block (B) is represented by the formula: Ta $\geq$ (Tb+40).

[6] A process for producing a polyether copolymer according to [1] to [5], wherein the process comprises reacting a bisphenol compound corresponding to the material for a moiety of the aromatic polyether block (A), a di-halogenated compound and an aliphatic polyether having an OH group at the terminal and corresponding to the material for a moiety of the aliphatic polyether block (B) in the presence of an alkali.

[7] The process according to [6], wherein a pre-reaction of the di-halogenated compound and the aliphatic polyether having an OH group at the terminal is carried out in the presence of an alkali, then the bisphenol compound and the di-halogenated compound are added to the reaction mixture and the reaction is continued in the presence of an alkali.

[8] A process according to any of [1] to [5], wherein the process comprises steps of metallizing an aromatic polyether corresponding to a moiety of (A), and carrying out a substitution reaction with a halide of an aliphatic polyether corresponding to a moiety of (B).

[9] A coating solution for forming a porous organic film comprising (a) a polyether copolymer according to any of [1] to [5] and (b) an organic solvent.

[10] A coating solution for forming a porous organic film comprising (c) a resin having a thermosetting functional group, in addition to (a) and (b) according to [9].

[11] The coating solution according to [10], wherein the resin having a thermosetting functional group (c) has a unit structure represented by the following formula (4):

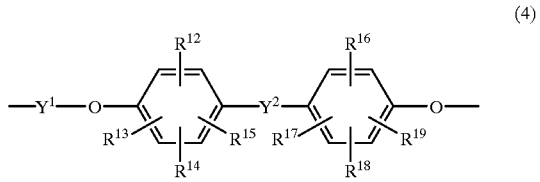

(4)

wherein $R^{12}$, $R^{13}$, $R^{14}$, $R^{15}$, $R^{16}$, $R^{17}$, $R^{18}$ and $R^{19}$ are independently selected from the group consisting of a hydrogen atom, a chlorine atom, an iodine atom, an alkyl group having 1 to 10 carbon atoms, an alkenyl group having 2 to 10 carbon atoms, an alkynil group having 2 to 10 carbon atoms, a cycloalkyl group having 4 to 10 carbon atoms, a methoxy group, an ethoxy group, a phenyl group which may be substituted and a functional group represented by the formula (2) described above; $Y^1$ is selected from any one of functional groups described below or two or more of the functional groups; $Y^2$ is selected from any one of a single bond, a hydrocarbon group having 1 to 20 carbon atoms, an ether group, a ketone group and a sulfone group or two or more of them; at least one of $R^{12}$, $R^{13}$, $R^{14}$, $R^{15}$, $R^{16}$, $R^{17}$, $R^{18}$ and $R^{19}$ or $Q^1$, $Q^2$, $Q^3$, $Q^4$, $Q^5$, $Q^6$, $Q^7$, $Q^8$, $Q^9$, $Q^{10}$, $Q^{11}$, $Q^{12}$ and $Q^{13}$ in at least one unit structure contained in a molecular chain is selected from an alkenyl group having 2 to 10 carbon atoms, an alkynil group having 2 to 10 carbon atoms and a functional group represented by the formula (2) described above;

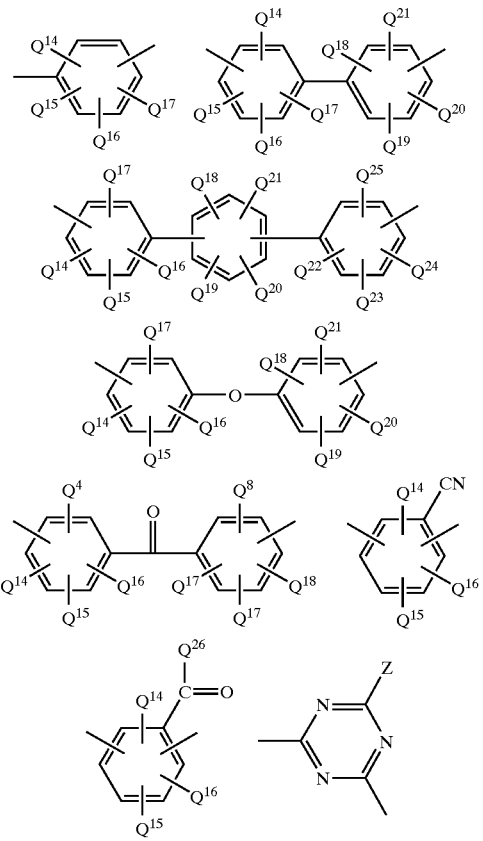

wherein $Q^{14}$, $Q^{15}$, $Q^{16}$, $Q^{17}$, $Q^{18}$, $Q^{19}$, $Q^{20}$, $Q^{21}$, $Q^{22}$, $Q^{23}$, $Q^{24}$ and $Q^{25}$ are independently selected from the group consisting of a hydrogen atom, an alkyl group having 1 to 10 carbon atoms, an alkenyl group having 2 to 10 carbon atoms, an alkynyl group having 2 to 10 carbon atoms and a functional groups represented by the formula (2) described above; $Q^{26}$ is selected from the group consisting of an alkyl group having 1 to 10 carbon atoms, an alkenyl group having 2 to 10 carbon atoms, an alkynyl group having 2 to 10 carbon atoms and a functional group represented by the formula (2) described above; and Z, $Z^1$, $Z^2$ and $Z^3$ have the same meaning as described above.

[12] The coating solution according to [10] or [11], wherein the thermal curing reaction starting temperature Tc of the resin having a thermosetting functional group (c) is less than Tb.

[13] The coating solution according to any of [9] to [12], wherein the organic solvent (b) comprises a solvent having an aromatic ring in its molecule and a boiling point of 250° C. or below.

[14] The coating solution according to any of [9] to [13], wherein the organic solvent (b) comprises at least one selected from the group consisting of anisole, phenetole and dimethoxybenzene.

[15] A process for forming a porous organic film, wherein the process comprises coating a substrate with a coating solution for forming a porous organic film according to any of [9] to [14], and carrying out a heat treatment to generate a void at a temperature of not less than the thermal decomposition starting temperature Tb of an aliphatic polyether block and at a temperature of less than the thermal decomposition starting temperature Ta of an aromatic polyether block.

[16] A process for forming a porous organic film, wherein the process comprises coating a substrate with a coating solution for forming a porous organic film according to any of [10] to [14], then thermally curing the film at a temperature of not less than the thermal curing reaction starting temperature Tc of a resin having a thermosetting functional group and at a temperature of less than the thermal decomposition starting temperature Tb of an aliphatic polyether block, and carrying out a heat treatment to generate a void at a temperature of not less than the thermal decomposition starting temperature Tb of an aliphatic polyether block and at a temperature of less than the thermal decomposition starting temperature Ta of an aromatic polyether block.

DETAILED DESCRIPTION OF THE INVENTION

The invention is described below in more detail.

The aromatic polyether block under item (A), described in [1] and [2], has a structure in which aromatic rings are bound through the intermediary of an ether bond in the molecular chain, and the aliphatic polyether block under item (B) has a structure in which saturated hydrocarbon groups are bound through the intermediary of an ether bond in the molecular chain. A porous film of an aromatic polyether having fine voids can be obtained by combining a product produced by block copolymerization or graft copolymerization of these molecular chains with an organic solvent and others to form a composition and subjecting the composition to a heat treatment under suitable conditions.

For the ratio of a moiety of (A) to a moiety of (B), preferable ratio is within a range of 1 to 90 moieties of (B) (by weight) based on 100 moieties of (A).

The aromatic polyether is advantageous because it has a low dielectric constant and a good insulation by itself, and making porous can attain further lowering of dielectric constant.

The aromatic polyether includes aromatic polyethers obtainable by oxidative polymerization, aromatic polyethers obtainable by polycondensation of a di-halogenated compound and a bisphenol compound and the like.

Particularly, the aromatic polyether having a unit structure represented by the formula (1) described in [3] above is preferred because it has a high solubility inorganic solvents, a good application property on coating and has a dielectric constant of 3.5 or less. Aromatic polyethers having such structure can generally be obtained by a polycondensation of a di-halogenated compound and a bisphenol compound.

The bisphenol compound corresponding to the material for a moiety of (A) described in [6] includes known bisphenol compounds such as bisphenol A, bisphenol F, bisphenol S, biphenol and the like. From a viewpoint of solubility of the copolymer in a solvent, it is preferred that the compound has a bulky substituent such as cyclohexyl group, tert-butyl group or the like on a position at which an aromatic ring or aromatic rings is/are bound. Specific examples include, but are not limited to, 1,1-bis(4-hydroxy-3-cyclohexylphenyl) cyclohexylidene and the like.

The di-halogenated compound includes dibromobenzene, diiodobenzene, dibromobiphenyl, diiodobiphenyl, dibromoterphenyl, diiodoterphenyl, difluorobenzophenone, difluoroacetophenone, difluorobenzonitrile, mono-substituted derivatives of cyanuryl chloride and the like. Compounds having three or more halogen atoms on an aromatic ring such as cyanuryl chloride, perfluorobenzene and the like can be used in the same way.

The aliphatic polyether having an OH group at a terminal includes polyethylene glycol and polypropylene glycol having OH's at the both terminals as well as polyethylene glycol and polypropylene glycol having OH at only one terminal. When a compound of the type having OH at only one terminal is used, the obtained copolymer is of a type having an aliphatic polyether polymerized at a terminal of an aromatic polyether.

The steps of metallizing an aromatic polyether corresponding to a moiety of (A) and of subsequent substitution reaction described in [8] can be carried out by a known method. Namely, it is a method in which a hydrogen atom bound to an aromatic ring in a polyether resin is subjected to a substitution reaction with a metal and then a substitution reaction with a halogenated compound of an aliphatic polyether is conducted. A solvent used in the metallization reaction is not particularly limited and ether compounds such as diethyl ether, tetrahydrofuran and the like are preferred in view of solubility, reactivity and others of the polyether resin.

Reactants used in the metallization reaction are not particularly limited. Examples include lithium metal, sodium metal, n-butyllithium, sec-butyllithium, tert-butyllithium and the like. In addition, phenyllithium, naphthalenesodium and alkylsodium can also be used. These can be used in the form of a solution in an organic solvent. From a viewpoint of workability, availability and so on, n-butyl lithium is suitably used.

The halogenated compound of the aliphatic polyether can be used in the form of a fluoride, chloride, bromide or iodide. These halogenated compounds can be obtained, for example, by converting an aliphatic polyether having an OH terminal by means of a normal known method using a thionyl halide or a known method using a carbon tetrahalide and a catalyst such as triphenylphosphine or the like.

The aliphatic polyether block under item (B) includes, but is not limited to, polyethylene glycol chain, polypropylene glycol chain and the like. The kind of the aliphatic polyether is not particularly limited and a halogenated product of polyethylene glycol and polypropylene glycol are suitably used in view of availability.

The molecular weight of the aliphatic polyether is not particularly limited and can be selected according to a desired pore diameter of void. When a compound having a larger molecular weight is used, the pore diameter becomes large, and when a compound having a smaller molecular weight is used, the pore diameter becomes small.

When a coating solution for forming porous organic film is made using a polyether copolymer of the invention, the organic solvent under item (b) is contained as an essential component. One such organic solvent or two or more in admixture may be used. Specific examples of the organic solvent include aromatic hydrocarbons such as benzene, toluene, xylene, mesitylene and the like; halogenated aromatic hydrocarbon such as chlorobenzene, dichlorobenzene and the like; phenol ethers such as anisole, phenetole, veratrole, phenyl propyl ether, dimethoxybenzene and the like; phenol compounds such as phenol, cresol and the like; alcohols such as methanol, ethanol, isopropanol, 1-butanol, 2-ethoxymethanol, 3-methoxypropanol and the like; ketones such as acetylacetone, methyl ethyl ketone, methyl isobutyl ketone, 3-pentanone, 2-heptanone and the like; esters such as propyl acetate, butyl acetate, propylene glycol monomethyl ether acetate, ethyl lactate and the like; ethers such as diisopropyl ether, dibutyl ether and the like.

Said organic solvent preferably contains a solvent having an aromatic ring in the molecule and a boiling point of 250° C. or below. Amongst them, it is suitable to use at least one selected from anisole, phenetole, and dimethoxybenzene, which are easily available in the industry.

When a coating solution for forming porous organic film is made, it is preferred to add a resin having a reactive group for closs-linking in addition to the organic solvent, because it causes a cross-linking reaction during heat treatment and enables maintenance of produced voids.

The resin having a thermosetting functional group is not particularly limited. Specific examples include various resins having an epoxy group; various resins having a cyanate group; various resins having unsaturated hydrocarbon reactive group for closs-linking such as allyl, vinyl, propargyl and the like. Particularly, from the viewpoint of highness of mutual solubility with said copolymer, a polyether having a backbone similar to the aromatic polyether moiety of said copolymer and modified by a reactive group for closs-linking can be suitably used.

Said resin having a reactive group for closs-linking specifically includes compounds having a unit structure represented by the formula (4) described above.

The coating solution of the invention can contain other additives in addition to the essential components of (a) and (b) or (a), (b) and (c). Examples of usable additives include coupling agents such as silane coupling agents and titanium coupling agents, surfactants, foaming agents. In addition, curing catalysts such as organic peroxides can be added in order to lower the curing temperature of the reactive group for closs-linking.

The process for forming a porous organic film of the invention comprises coating a substrate with a coating solution for forming a porous organic film of the invention, and subsequently carrying out a heat treatment at a temperature equal to or above Tb and below Ta to generate a void, thereby forming a porous organic film. Particularly, when a coating solution for forming a porous organic film containing a resin having a thermosetting functional group is used, a more preferable result can be obtained by carrying out the above heat treatment after curing at a temperature equal to or above the curing starting temperature Tc and below Tb and carrying out the cross-linking reaction.

When a porous film is obtained by subjecting said film of copolymer to the heat treatment to cause decomposition of the molecular chain of (B), it is preferable that the difference between the thermal decomposition starting temperatures of the molecular chain (A) and of the molecular chain (B), i.e., Ta and Tb, is 40° C. or more. When the difference of the both is less than 40° C., there may be a possibility of causing fracture of the film.

Method for coating a substrate with a coating solution for forming a porous organic film includes, but is not limited to, spin coating method, roller coating method and dip coating method.

The voids in the porous organic film obtained by the above processes preferably have an aperture of 0.1 $\mu$m or less. Method for heating is not particularly limited and usable methods include hot plate heating method, a method using a furnace oven, light irradiation heating method with a xenon lamp using RTP or the like.

EXAMPLES

The following Examples are given for more detailed illustration of the invention and the scope of the invention is not to be considered limited to such Examples.

Example 1

Synthesis of Polyether-Polyethylene Glycol Block Copolymer

Pre-Reaction

Into a four-necked flask were charged 10.9 g of 4,4'-difluorobenzophenone, 10.9 g of UnioxM-400 (manufactured by NOF Corp.), 20.7 g of potassium carbonate and 150 g of DMF, and they were stirred at 100° C. for 10 hours in total. Uniox?? (manufactured by by NOF Corp.) was a polyethylene glycol having an average molecular weight of 400 and being methyl-etherified at one terminal. The degree of conversion was 41.6% (are a percentage by LC analysis)

Resin Synthesis

Into a four-necked flask were charged 10.9 g of 4,4'-difluorobenzophenone, 20.7 g of potassium carbonate and 150 g of DMF. The above pre-reaction mass was added thereto and then the mixture was stirred at 100° C. for 6 hours. The reaction mass was charged into a 1,000/40 (g/g) mixture of methanol/acetic acid. The resulting mixture was filtered, washed with methanol and washed three times with water. Results of W/C=62.7 g and D/C=38.8 g were obtained. Measurement of proton-NMR indicated that the content of polyethylene glycol was 0.9% in weight ratio.

Reference Example 1

Synthesis of Polyether by Ullmann Reaction

Into a 500-ml four-necked flask were charged 21.6 g of 1,1-bis(4-hydroxycyclohexylphenyl)cyclohexylidene, 4.0 g of sodium hydroxide, 70.0 g of benzophenone and 50.0 g of toluene. The mixture was dehydrated by reflux. After completion of dehydration, 15.6 g of dibromobiphenyl was added. In addition, a solution of 0.05 g of cuprous chloride dissolved in 5 g of pyridine was added thereto and the mixture was reacted at an inside temperature of 185° C. for 6 hours. After cooling to room temperature, the reaction solution was added to a mixed solution of 600 g of methanol and 10 g of acetic acid, upon which the product deposited.

The deposited crystals were filtered and washed with a large amount of methanol to give a high molecular weight product. The high molecular weight product was dried at 60° C. for 8 hours under reduced pressure.

Reference Example 2

To 4.0 g of the high molecular weight product obtained in Reference Example 1 was added 100 ml of tetrahydrofuran, whereby the high molecular weight product was dissolved. In addition, 21.5 ml of n-butyllithium (1.6M solution in n-hexane) was added and the mixture was stirred for 1 hour in a nitrogen stream. Then, 4.0 g of allyl bromide was added and the stirring was continued for about 1 hour. After the reaction was completed, the reaction solution was charged into a mixed solvent consisting of 650 g of methanol and 20 g of acetic acid, upon which a high molecular weight product deposited. The product was filtered, washed with methanol and then with water. The product was dried at 60° C. for 8 hours under reduced pressure to give a white powdery product.

Reference Example 3

After charging 50.0 g of polyethylene glycol having OH at one terminal (Uniox-1000, manufactured by NOF Corp.), 9.6 g of carbon tetrabromide and 75 g of methylene chloride, the mixture was stirred at room temperature for 30 minutes. To this mixture was added 19.7 g of triphenylphosphine. The mixture was stirred for 30 hours and then the solvent was distilled out. Diethyl ether was added for deposition to give polyethylene glycol having a bromine terminal.

Example 2

Synthesis of Polyether-Polyethylene Glycol Graft Copolymer

To 4.0 g of the high molecular weight product obtained in Reference Example 1 was added 100 ml of tetrahydrofuran, whereby the high molecular weight product was dissolved. In addition, 32.6 ml of n-butyllithium (1.6M solution in n-hexane) was added and the mixture was stirred for 2.5 hours in a nitrogen stream. Thereafter, a dispersion of 4.0 g of polyethylene glycol having a bromine terminal obtained in Reference Example 3 in tetrahydrofuran was added thereto and the stirring was continued for 6 hours. Further, 4.0 g of allyl bromide was added and the stirring was continued for 2 hours. After the reaction was completed, the reaction solution was charged into a mixed solvent consisting of 1,000 g of methanol and 20 g of acetic acid, upon which a high molecular weight product deposited. The product was filtered, washed with methanol and then with water. The product was dried at 60° C. for 8 hours under reduced pressure to give a white powdery product.

Example 3

Preparation of Porous Film

Into 17.0 g of anisole were dissolved 1.5 g of the high molecular weight product obtained in Reference Example 2 and 1.5 g of the high molecular weight product obtained in Example 2. The solution was filtered through a 0.2 μm filter to prepare a coating solution.

The obtained coating solution was spin-coated onto a 4-inch silicon wafer at a revolution number of 2,000 rpm. A prebake was carried out at 150° C. for 1 minute to remove almost all amount of anisole. Then, a heat treatment was carried out at 300° C. for 90 minutes and at 350° C. for 30 minutes in a nitrogen atmosphere.

The obtained porous film was subjected to cutting together with the wafer. Palladium was deposited onto the cross section (with a thickness of deposited palladium film of 1 nm), which was observed with SEM (S-470, manufactured by Hitachi), and the film thickness and pore diameter of void obtained by making porous were measured. The result showed that the film thickness was about 3,700 angstroms and the pore diameter of void was 100 to 200 angstroms or below.

The invention enables formation of porous organic films that allow lowering of dielectric constant as insulation materials usable in electronic parts by using a coating solution containing a polyether copolymer of the invention. Therefore, the invention has a great industrial value.

What is claimed is:

1. A polyether copolymer comprising (A) an aromatic polyether block and (B) an aliphatic polyether block, wherein (B) the aliphatic polyether block is on a side chain of (A) the aromatic polyether block.

2. The polyether copolymer according to claim 1, wherein the aromatic polyether block (A) has a structural unit represented by the following formula (1):

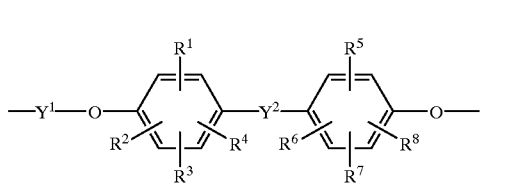

wherein $R^1$, $R^2$, $R^3$, $R^4$, $R^5$, $R^6$, $R^7$ and $R^8$ are independently selected from the group consisting of a hydrogen atom, a chlorine atom, an iodine atom, an alkyl group having 1 to 10 carbon atoms, an alkenyl group having 2 to 10 carbon atoms, an alkynyl group having 2 to 10 carbon atoms, a cycloalkyl group having 4 to 10 carbon atoms, a methoxy group, an ethoxy group, a phenyl group which may be substituted and a functional group represented by the formula (2) or (3) described below; $Y^1$ is selected from any one of functional groups described below or two or more of the functional groups;

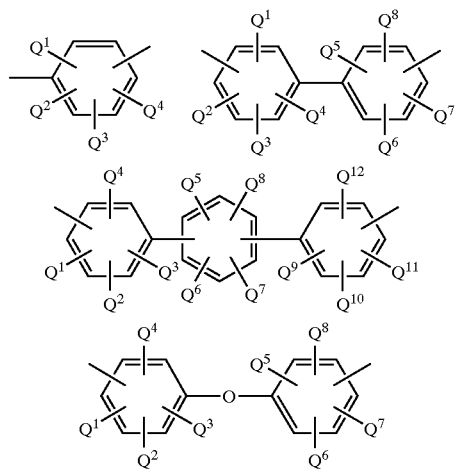

-continued

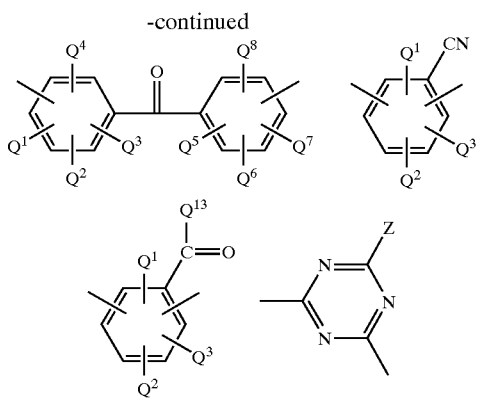

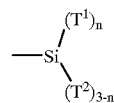

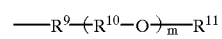

$Y^2$ is any one of single bond, hydrocarbon group having 1 to 20 carbon atoms, an ether group, a ketone group and a sulfone group or two or more of them; at least one of $R^1$, $R^2$, $R^3$, $R^4$, $R^5$, $R^6$, $R^7$ and $R^8$ or $Q^1$, $Q^2$, $Q^3$, $Q^4$, $Q^5$, $Q^6$, $Q^7$, $Q^8$, $Q^9$, $Q^{10}$, $Q^{11}$, $Q^{12}$ and $Q^{13}$ in at least one unit structure contained in a molecular chain is selected from functional groups represented by the formula (3);

wherein $Q^1$, $Q^2$, $Q^3$, $Q^4$, $Q^5$, $Q^6$, $Q^7$, $Q^8$, $Q^9$, $Q^{10}$, $Q^{11}$, and $Q^{12}$ are independently selected from the group consisting of a hydrogen atom, an alkyl group having 1 to 10 carbon atoms, an alkenyl group having 2 to 10 carbon atoms, an alkynyl group having 2 to 10 carbon atoms and a functional group represented by the formula (2) or (3) described below; $Q^{13}$ is selected from the group consisting of an alkyl group having 1 to 10 carbon atoms, an alkenyl group having 2 to 10 carbon atoms, an alkynyl group having 2 to 10 carbon atoms and a functional group represented by the formula (2) or (3) described below; Z is selected from the group consisting of a hydrogen atom, a fluorine atom, a chlorine atom, a bromine atom, an iodine atom, a group -$OZ^1$ and a group -$NZ^2Z^3$; and $Z^1$, $Z^2$ and $Z^3$ are independently selected from the group consisting of a hydrogen atom, a saturated or unsaturated hydrocarbon group and an ether bond-containing group;

$$-\underset{(T^2)_{3-n}}{\overset{(T^1)_n}{Si}}- \quad (2)$$

wherein $T^1$ is selected from an alkenyl group having 2 to 10 carbon atoms; $T^2$ is selected from an alkyl group having 1 to 10 carbon atoms and an aryl group; n represents an integer of 1 to 3 inclusive; plural $T^1$'s may be different from each other and plural $T^2$'s may also be different from each other;

$$-R^9-(R^{10}-O)_m-R^{11} \quad (3)$$

wherein $R^9$ is selected from a single bond and a hydrocarbon group having 1 to 10 carbon atoms; $R^{10}$ is selected from a hydrocarbon group having 1 to 10 carbon atoms; $R^{11}$ is selected from a hydrogen atom and a hydrocarbon group having 1 to 10 carbon atoms; and m is selected from an integer of 1 or more.

3. The polyether copolymer according to claim 2, wherein $R^{10}$ is —$CH_2$—$CH_2$—, —$CH_2$—$CH(CH_3)$— or —$CR(CH_3)$—$CH_2$—.

4. The polyether copolymer according to claim 1, wherein the relation between the thermal decomposition starting temperature Ta (° C.) of the aromatic polyether block (A) and the thermal decomposition starting temperature Tb (° C.) of the aliphatic polyether block (B) is represented by the formula: Ta≧(Tb+40).

* * * * *